Figures 1, 2, 3:
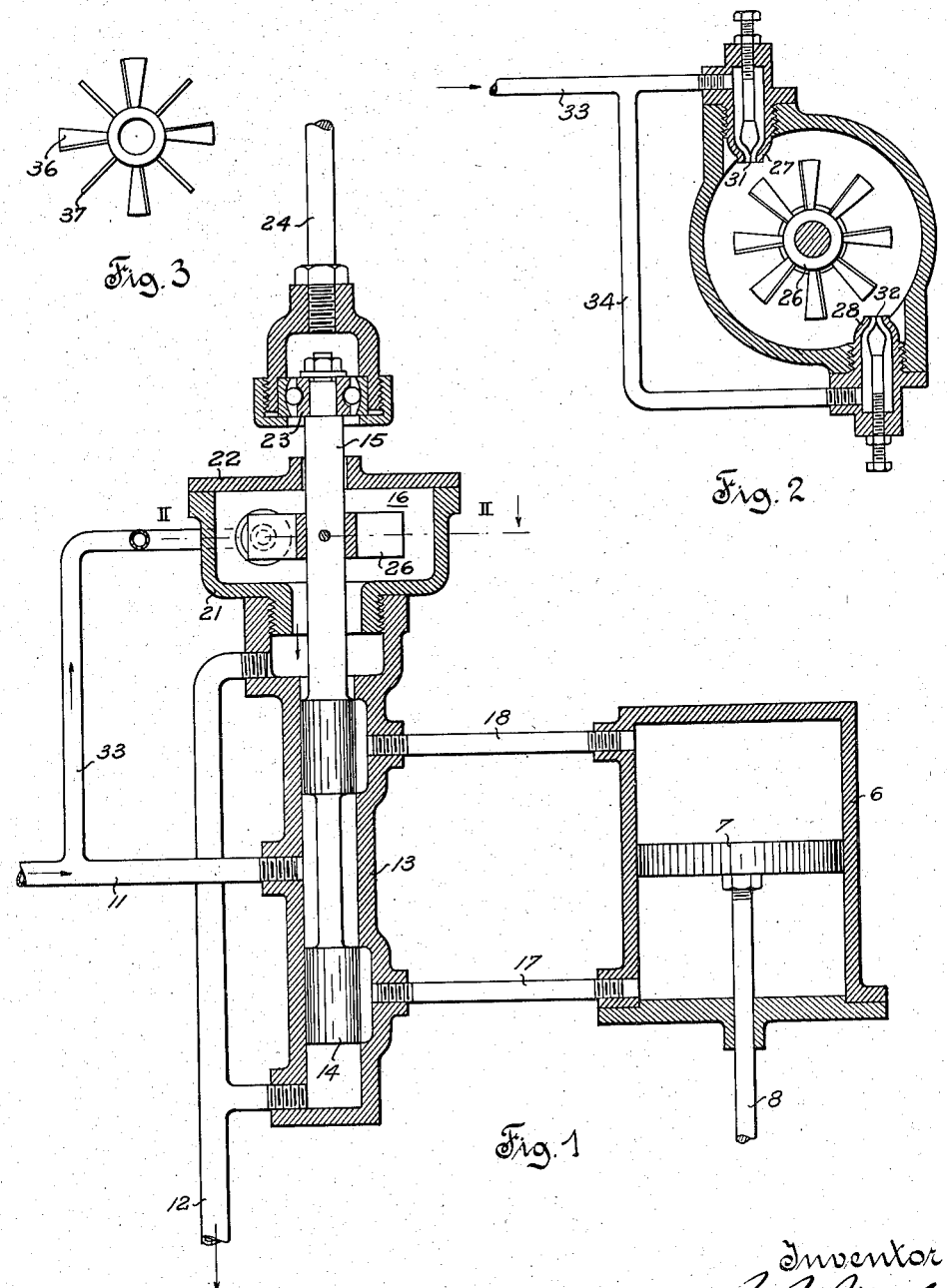

July 19, 1938.  B. R. NICHOLS  2,124,274

PILOT VALVE

Filed July 29, 1936

Inventor
B. R. Nichols
by
Attorney

Patented July 19, 1938

2,124,274

UNITED STATES PATENT OFFICE 2,124,274

PILOT VALVE

Beverly R. Nichols, Wauwatosa, Wis., assignor to Allis-Chalmers Manufacturing Company, Milwaukee, Wis., a corporation of Delaware Application July 29, 1936, Serial No. 93,130

6 Claims. (Cl. 137—139)

This invention relates to improvements in valve operating means and particularly to means for maintaining a valve in continuous motion to minimize the force required to secure fluid flow control movement of such valve.

Many of the machines constructed at the present time require the application of power for the control of such machines in which such required power is greater in magnitude than can be conveniently exerted by the machine operator or must be supplied in relatively inaccessible locations. In many cases it is most convenient and desirable to employ fluid pressure as the operating medium for obtaining such power operation of machine parts. However, when fluid pressure is transmitted to a servomotor for operating a machine part, it is necessary to control the application of such fluid pressure by means of a control valve and such control valve must be substantially instantaneously responsive and must generally be responsive to the very small forces which can be produced by highly sensitive means from which it is impossible to abstract any material amount of power without detracting materially from the sensitivity of the control means.

It is, therefore, one of the objects of the present invention to provide a valve for controlling fluid pressure in which the static friction of the valve when at rest is replaced by the lesser dynamic friction of the valve in motion.

Another object of the invention is to provide a valve for controlling the flow of fluid pressure in which the sensitiveness of the valve to any control impulse is increased by maintaining the valve in continuous motion.

Another object of the invention is to provide a valve for controlling the flow of fluid pressure in which the valve is continuously rotated to improve the responsiveness of the valve to control movements for producing longitudinal movement of such valve.

Another object of the invention is to provide a valve for controlling the flow of fluid pressure in which the valve is subject to a force for continuously maintaining the valve in vibratory rotary motion.

Another object of the invention is to provide a valve for controlling the flow of fluid pressure in which the valve is kept in motion by the application of fluid pressure thereto from the flow of fluid pressure which is controlled by such valve.

Objects and advantages, other than those above set forth, will be apparent from the following description when read in connection with the accompanying drawing in which:

Fig. 1 is a vertical sectional view of a control valve for a fluid pressure operated servomotor and illustrates one embodiment of the valve rotating means of the present invention as applied to such control valve;

Fig. 2 is a horizontal sectional view, taken on the plane II—II of Fig. 1, to illustrate in plan and therefore more clearly the construction of the fluid pressure operating means for maintaining the valve in continuous rotary motion; and Fig. 3 is a plan view of a modified form of impeller applicable to the control valve to produce a vibratory rotary motion rather than a continuous rotary motion such as is obtained from the construction shown in Figs. 1 and 2.

Referring more particularly to the drawing by characters of reference, the reference numeral 6 designates the cylinder of a servomotor having a piston 7 movable within the cylinder for the purpose of actuating a piston rod 8 to be connected with any portion of any machine to which power is to be applied. Fluid under pressure from any of the usual (and therefore not shown) sources of such fluid pressure is supplied by way of conduit 11 and is discharged by way of a conduit 12, both conduits being connected with a control valve generally comprising a casing 13, a valve body 14 and means for operating the valve body and generally designated by the reference numeral 16. The valve and the servomotor are connected to provide for the flow of fluid through the valve to the opposite sides of the servomotor piston by way of the connecting conduits 17 and 18.

The valve body 14 is in the form of a plurality of pistons connected by a stem of a diameter smaller than the diameters of the pistons and movable within a cylinder formed by a portion of the valve casing 13 with suitable enlargements about the juncture of the casing and the servomotor connections 17 and 18. Assuming that the servomotor piston 7 is to be raised relative to the servomotor cylinder 6, fluid pressure is supplied from the pressure supply conduit 11 to the valve casing between the piston portions of the valve 14 and, upon downward movement of the valve from the position shown, is applied through the connection 17 to the underside of the servomotor piston 7, thus raising the piston and forcing the fluid above the servomotor piston out through the connection 18 and above the upper piston portion of the valve 14 into the discharge conduit 12.

The upper portion of the valve casing 13 is enlarged or otherwise suitably formed to provide for attachment thereto of a casing 21, open at the bottom to the discharge conduit 12 and provided at the top thereof with a suitable cover 22. The valve stem 15 extends through the casing 21 and beyond the cover 22 thereof for attachment thereto of a suitable anti-friction bearing 23 by which the stem is connected with a rod 24 which is in turn connected with the control means to be employed such as the usual speed governor, a remotely controlled solenoid or other known means by which an impulse for longitudinal movement may be given to the valve 14. It is desirable that the bearing 23 be capable of functioning also as a universal joint within at least small limits as is possible when a ball bearing such as shown is used.

A vane wheel 26 is mounted on the stem 15 within the wheel casing 21 which is provided with a plurality of nozzles 27 and 28 provided with nozzle opening control needles 31 and 32 respectively, the nozzles being connected with the fluid pressure supply line 11 by conduits 33 and 34. The nozzles discharge fluid under pressure against the vanes of the wheel, thus causing rotation of the wheel and of the valve connected therewith, under the impulse of the jets of fluid from the nozzles. Continuous rotation of the valve 14 maintains a continuous fluid film between the valve 14 and the valve casing 13, thus diminishing the resistance of the valve to longitudinal movement thereof. Such rotation also substitutes a spiral path for the longitudinal movement of the valve instead of a straight line path such as was obtained heretofore. It is well known that such spiral movement offers less resistance to motion than the usual straight line path.

Under some conditions it may be desired to vary the rotary motion of the impulse wheel 26 from a uniform and continuous rotation to a non-uniform rotary movement. Such operation can be obtained by providing the wheel with alternately inclined and vertical vanes as shown respectively at 36 and 37 in Fig. 3. The degree of inclination of the several vanes to the vertical axis through the valve 14 may be varied as desired to give any degree of non-uniform rotary movement desired. If all of the vanes are inclined in the same direction, the jets impinge on the vanes and will produce a force acting in only one direction. All lost motion in the various couplings and joints of the device will thus be taken up in the same direction with an increased responsiveness of the valve in such direction. Further, if all of the vanes are inclined by the same amount, the jets will impinge on the vanes with a substantially equal force, thus producing a continuous smooth rotary motion. However, if a vibratory motion is produced by employing a wheel with alternately inclined and vertical vanes or a wheel in which the several vanes are inclined to the vertical axis by different amounts, the sensitivity of the valve will be increased in both directions.

Although but two embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. In a valve for controlling the flow of fluids under pressure, a valve casing, fluid pressure supply and discharge conduits connected with said casing, a valve body both rotatably and longitudinally movable within said casing, a vane wheel operable by fluid pressure and directly connected with said valve body for rotating the same to reduce the resistance thereof to longitudinal movement, the vanes of said wheel being inclined relative to the axis of the valve, and means for controlling the application of fluid pressure to said wheel to control the rotation thereof.

2. In a valve for controlling the flow of fluids under pressure, a valve casing, fluid pressure supply and discharge conduits connected with said casing, a valve body both rotatably and longitudinally movable within said casing, a vane wheel operable by fluid pressure and directly connected with said valve body for rotating the same to reduce the resistance thereof to longitudinal movement, the vanes of said wheel being inclined by the same amount to the axis of the valve, and means for controlling the application of fluid pressure to said wheel to control the rotation thereof.

3. In a valve for controlling the flow of fluids under pressure, a valve casing, fluid pressure supply and discharge conduits connected with said casing, a valve body both rotatably and longitudinally movable within said casing, a vane wheel operable by fluid pressure and directly connected with said valve body for rotating the same to reduce the resistance thereof to longitudinal movement, the vanes of said wheel being inclined by the same amount and in the same direction to the axis of the valve, and means for controlling the application of fluid pressure to said wheel to control the rotation thereof.

4. In a valve for controlling the flow of fluids under pressure, a valve casing, fluid pressure supply and discharge conduits connected with said casing, a valve body both rotatably and longitudinally movable within said casing, a vane wheel operable by fluid pressure and directly connected with said valve body for rotating the same to reduce the resistance thereof to longitudinal movement, some of the vanes of said wheel being arranged vertical and some inclined relative to the axis of the valve, and means for controlling the application of fluid pressure to said wheel to control the rotation thereof.

5. In a valve for controlling the flow of fluids under pressure, a valve casing, fluid pressure supply and discharge conduits connected with said casing, a valve body both rotatably and longitudinally movable within said casing, a vane wheel operable by fluid pressure and directly connected with said valve body for rotating the same to reduce the resistance thereof to longitudinal movement, the vanes of said wheel being alternately vertical and inclined, and means for controlling the application of fluid pressure to said wheel to control the rotation thereof.

6. In a valve for controlling the flow of fluids under pressure, a valve casing, fluid pressure supply and discharge conduits connected with said casing, a valve body both rotatably and longitudinally movable within said casing, a vane wheel operable by fluid pressure and connected with said valve body for simultaneously rotating and for producing an axial movement of the same to reduce the resistance thereof to longitudinal movement, at least certain of the vanes of said wheel being at an angle relative to the axis of the valve, and means for controlling the application of fluid pressure to said wheel to control the rate of rotation thereof.

BEVERLY R. NICHOLS.